US010171422B2

(12) United States Patent
Mraz et al.

(10) Patent No.: US 10,171,422 B2
(45) Date of Patent: Jan. 1, 2019

(54) DYNAMICALLY CONFIGURABLE PACKET FILTER

(71) Applicant: Owl Computing Technologies, Inc., Ridgefield, CT (US)

(72) Inventors: Ronald Mraz, South Salem, NY (US); Robert M. Zucker, Brewster, NY (US)

(73) Assignee: Owl Cyber Defense Solutions, LLC, Danbury, CT (US)

( * ) Notice: Subject to any disclaimer, the term of this patent is extended or adjusted under 35 U.S.C. 154(b) by 295 days.

(21) Appl. No.: 15/098,841

(22) Filed: Apr. 14, 2016

(65) Prior Publication Data

US 2017/0302625 A1    Oct. 19, 2017

(51) Int. Cl.
*H04L 29/06* (2006.01)

(52) U.S. Cl.
CPC .................. *H04L 63/0227* (2013.01)

(58) Field of Classification Search
CPC .................................................. H04L 63/0227
See application file for complete search history.

(56) References Cited

U.S. PATENT DOCUMENTS

| | | | |
|---|---|---|---|
| 5,703,562 A | 12/1997 | Nilsen | |
| 6,182,228 B1 * | 1/2001 | Boden | H04L 45/00 709/227 |
| 6,560,699 B1 * | 5/2003 | Konkle | G06F 9/44505 713/1 |
| 7,355,970 B2 * | 4/2008 | Lor | H04L 49/351 370/231 |
| 7,434,254 B1 * | 10/2008 | Foschiano | H04L 29/12028 713/153 |
| 7,675,867 B1 | 3/2010 | Mraz et al. | |
| 7,941,526 B1 * | 5/2011 | Hope | H04L 41/069 709/224 |
| 7,948,986 B1 * | 5/2011 | Ghosh | H04L 45/50 370/392 |
| 7,992,209 B1 * | 8/2011 | Menoher | H04L 63/105 726/16 |
| 8,068,415 B2 | 11/2011 | Mraz | |
| 8,139,581 B1 | 3/2012 | Mraz et al. | |
| 8,266,689 B2 | 9/2012 | Menoher et al. | |
| 8,352,450 B1 | 1/2013 | Mraz et al. | |
| 8,353,022 B1 | 1/2013 | Menoher et al. | |
| 8,498,206 B2 | 7/2013 | Mraz | |

(Continued)

*Primary Examiner* — Joseph P Hirl
*Assistant Examiner* — J. Brant Murphy
(74) *Attorney, Agent, or Firm* — Economou Silfin, LLP; John S. Economou

(57) ABSTRACT

A configurable packet filtering system includes a packet filter configured to receive packets or groups of packets on an input. The packet filter compares predetermined portions of the received packets with information or criteria stored in a filter configuration file, and, if the information at the predetermined portions of the packets or groups of packets matches the information or criteria stored in the filter configuration file, forwards the packets or groups of packets on an output. The configurable packet filtering system also includes a filter configuration interface which is configured to receive a file on an input, to verify that the received file conforms to a predetermined specification, and, if the received file conforms to the predetermined specification, to replace the filter configuration file with the received file.

35 Claims, 5 Drawing Sheets

(56) References Cited

U.S. PATENT DOCUMENTS

| | | |
|---|---|---|
| 8,516,580 B2 | 8/2013 | Menoher |
| 8,565,237 B2 | 10/2013 | Mraz et al. |
| 8,646,094 B2 | 2/2014 | Staubly |
| 8,732,453 B2 | 5/2014 | Mraz et al. |
| 8,776,254 B1 | 7/2014 | Mraz et al. |
| 8,831,222 B2 | 9/2014 | Menoher et al. |
| 8,839,417 B1* | 9/2014 | Jordan ................ H04L 63/0227 726/22 |
| 8,887,276 B2 | 11/2014 | Mraz et al. |
| 8,898,227 B1 | 11/2014 | Mraz et al. |
| 8,938,795 B2* | 1/2015 | Clarke ................ H04N 21/236 726/13 |
| 8,997,202 B2 | 3/2015 | Curry et al. |
| 9,065,878 B2 | 6/2015 | Curry et al. |
| 9,081,520 B2 | 7/2015 | Mraz et al. |
| 9,088,539 B2 | 7/2015 | Mraz |
| 9,088,558 B2 | 7/2015 | Curry et al. |
| 9,094,401 B2 | 7/2015 | Mraz |
| 9,282,102 B2 | 3/2016 | Mraz |
| 9,305,189 B2 | 4/2016 | Mraz et al. |
| 9,306,953 B2 | 4/2016 | Mraz et al. |
| 9,380,064 B2* | 6/2016 | Mraz ................ H04L 63/0227 |
| 2003/0091042 A1* | 5/2003 | Lor ................ H04L 49/351 370/389 |
| 2003/0115222 A1* | 6/2003 | Oashi ................ H04L 65/4076 |
| 2003/0123465 A1* | 7/2003 | Donahue ................ H04L 45/02 370/401 |
| 2004/0157624 A1* | 8/2004 | Hrastar ................ H04L 41/0893 455/456.1 |
| 2004/0162805 A1* | 8/2004 | Wozniak ................ G06F 17/5022 |
| 2005/0063377 A1* | 3/2005 | Bryant ................ H04L 43/18 370/389 |
| 2005/0268335 A1* | 12/2005 | Le ................ H04L 63/0263 726/13 |
| 2006/0031921 A1* | 2/2006 | Danforth ................ H04L 63/10 726/1 |
| 2006/0036733 A1* | 2/2006 | Fujimoto ................ H04L 61/2015 709/225 |
| 2006/0187925 A1* | 8/2006 | Brune ................ H04L 29/06 370/389 |
| 2007/0005786 A1* | 1/2007 | Kumar ................ G06F 8/656 709/230 |
| 2007/0147383 A1* | 6/2007 | Kojima ................ H04L 63/0227 370/392 |
| 2007/0271253 A1* | 11/2007 | Lebrat ................ G06K 9/00523 |
| 2009/0052454 A1* | 2/2009 | Pourcher ................ H04L 43/00 370/392 |
| 2009/0290501 A1* | 11/2009 | Levy ................ H04L 49/70 370/250 |
| 2010/0043072 A1* | 2/2010 | Rothwell ................ G06F 21/566 726/24 |
| 2010/0192217 A1* | 7/2010 | Arnold ................ H04L 63/105 726/13 |
| 2010/0309878 A1* | 12/2010 | Stolyar ................ H04W 88/005 370/331 |
| 2011/0035469 A1* | 2/2011 | Smith ................ H04L 61/1511 709/220 |
| 2011/0173342 A1* | 7/2011 | Cooper ................ H04L 41/046 709/233 |
| 2011/0264822 A1* | 10/2011 | Ferguson ................ H04L 45/00 709/235 |
| 2012/0030768 A1 | 2/2012 | Mraz et al. |
| 2012/0162697 A1 | 6/2012 | Mraz et al. |
| 2013/0246627 A1* | 9/2013 | Taylor ................ H04L 63/0263 709/227 |
| 2013/0254878 A1 | 9/2013 | Mraz et al. |
| 2014/0020109 A1* | 1/2014 | Mraz ................ H04L 63/0428 726/26 |
| 2014/0089388 A1* | 3/2014 | Curry ................ H04L 67/42 709/203 |
| 2014/0136657 A1 | 5/2014 | Mraz |
| 2014/0139737 A1* | 5/2014 | Clarke ................ H04N 21/236 348/465 |
| 2014/0165182 A1 | 6/2014 | Curry et al. |
| 2014/0207939 A1 | 7/2014 | Mraz et al. |
| 2014/0208420 A1 | 7/2014 | Mraz et al. |
| 2014/0237372 A1 | 8/2014 | Mraz et al. |
| 2014/0237561 A1 | 8/2014 | Mraz |
| 2014/0304371 A1 | 10/2014 | Mraz et al. |
| 2014/0337410 A1 | 11/2014 | Mraz et al. |
| 2015/0020155 A1 | 1/2015 | Curry et al. |
| 2015/0020194 A1* | 1/2015 | Mraz ................ H04L 63/0227 726/22 |
| 2015/0026792 A1 | 1/2015 | Mraz et al. |
| 2015/0059395 A1 | 2/2015 | Mraz et al. |
| 2015/0067104 A1 | 3/2015 | Curry et al. |
| 2015/0278520 A1 | 10/2015 | Mraz et al. |
| 2015/0370826 A1 | 12/2015 | Mraz et al. |

\* cited by examiner

DYNAMICALLY CONFIGURABLE PACKET FILTER

FIELD

This disclosure relates generally to a cross-domain solution having a dynamically configurable packet filter.

BACKGROUND

A cross-domain solution (CDS) is a system that provides the ability to access or transfer data between two networks having differing security domains. A CDS may be one-way only (from a low to a high domain or from a high to a low domain) or may be two-way. For a one-way CDS, highly engineered solutions, such as the Owl Computing Technologies® Dual Diode, provide a direct point-to-point optical link between the two networks having differing security domains (with data transfer in either the low-to-high direction or in the low-to-high direction). The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode. CDS systems may include data filters to filter the data being transmitted across the one-way data link. Such filters constitute a software process which performs particular and predetermined processing of the data being transmitted, and may include both generic (e.g., antivirus) and custom (e.g., customer defined) portions.

Since a CDS system typically includes a hardened operating system (e.g., based upon SELinux), the filters in conventional CDS systems are fixed at deployment and cannot be easily changed thereafter. In addition, a custom data filter may include information which is highly confidential and the customer developing such custom data filter may wish to limit distribution of such filter as much as possible—ideally such filter should be kept within the security domain the filter is designed to protect. This limited distribution is not possible, however, with conventional CDS systems in which all filters are included within the hardened system at deployment.

Accordingly, there is a need for a dynamically configurable filter system for a cross-domain system.

SUMMARY

In one aspect, a configurable packet filtering system includes a packet filter and a filter configuration interface. The packet filter is configured to receive packets or groups of packets on an input, to compare predetermined portions of the packets or groups of packets with information or criteria stored in a filter configuration file, and, if the information at the predetermined portions of the packets or groups of packets matches the information or criteria stored in the filter configuration file, to forward the packets or groups of packets on an output. The filter configuration interface is configured to receive a file on an input, to verify that the received file conforms to a predetermined specification, and, if the received file conforms to the predetermined specification, to replace the filter configuration file with the received file.

In one further embodiment, the input of the packet filter may be a first network interface connection and the input of the filter configuration interface may be a second network interface. The first network interface may be coupled to a first network and the second network interface may be coupled to a second network, separate from the first network.

In another further embodiment, the input of the packet filter may be a first port of a network interface connection that is coupled to a network and the input of the filter configuration interface may be a second separate port of the network interface. The output of the packet filter may be coupled to a destination client via a one-way data link.

In a still further embodiment, the filter configuration file may be an Extensible Markup Language (XML) file that includes information specifying an intra-packet location and associated data or criteria, with the packet filter further configured to compare data in the received packet or groups of packets at the intra-packet location specified in the XML file with the associated data or criteria in the XML file, and to only forward the received packet or groups of packets on the output if the data in the received packet or groups of packets at the intra-packet location specified in the XML file matches the corresponding data or criteria in the XML file.

The predetermined portions of the packets or groups of packets may be determined based on information included within the filter configuration file.

In yet another further embodiment, the output of the packet filter may be a first network interface connection and the input of the filter configuration interface may be a second network interface. The first network interface may be coupled to a first network and the second network interface may be coupled to a second network, separate from the first network. Alternatively, the output of the packet filter may be a first port of a network interface connection that is coupled to a network and the input of the filter configuration interface may be a second separate port of the network interface. Further, the input of the packet filter may be coupled to a source server via a one-way data link.

In another aspect, a system transfers packetized information from a source in a first network domain to a destination in a second network domain. The system includes a one-way data link, a first server computer and a second server computer. The one-way data link has an input and an output. The first server computer is coupled to receive packetized information from a source via a first network in the first network domain and includes a packet filter, a filter configuration interface and a send application. The packet filter is configured to receive packets or groups of packets on an input coupled to the first network, to compare predetermined portions of the packets or groups of packets with information or criteria stored in a filter configuration file, and, if the information at the predetermined portions of the packets or groups of packets matches the information or criteria stored in the filter configuration file, to forward the packets or groups of packets on an output. The filter configuration interface is configured to receive a file on an input, to verify that the received file conforms to a predetermined specification, and, if the received file conforms to the predetermined specification, to replace the filter configuration file with the received file. The send application is configured to receive packetized information from the output of the packet filter and to forward the packetized information to the input of the one-way data link. The second server computer is coupled to the output of the one-way data link and includes a receive application for receiving the packetized information from the one-way data link and configured to forward the received packetized information to a destination client via a second network in the second network domain.

In yet another aspect, a system for selectively transfers packetized information from one of a plurality of sources in a first network domain to a destination in a second network domain. The system includes a one-way data link, a first server computer, a second server computer and a third server computer. The one-way data link has an input and an output. The first server computer is coupled to receive packetized information from a plurality of sources via a first network in the first network domain, the packetized information including a source designation. The first server computer includes a packet filter, a filter configuration interface and a send application. The packet filter is configured to receive packets or groups of packets on an input coupled to the first network, to compare predetermined portions of the packets or groups of packets with information or criteria stored in a stored filter configuration file, and, if the information at the predetermined portions of the packets or groups of packets matches the information or criteria stored in the stored filter configuration file, to forward the packets or groups of packets on an output. The filter configuration interface is configured to receive an updated filter configuration file on an input, to verify that the received updated filter configuration file conforms to a predetermined specification, and, if the received updated filter configuration file conforms to the predetermined specification, to replace the stored filter configuration file with the received updated filter configuration file. The send application is configured to receive packetized information from the output of the packet filter and to forward the packetized information to the input of the one-way data link. The second server computer is coupled to the output of the one-way data link and includes a receive application for receiving the packetized information from the one-way data link and configured to forward the received packetized information to a destination via a second network in the second network domain. The third server computer is in the first network domain and is coupled to the first server computer. The third server computer is configured to provide the updated filter configuration file to the filter configuration interface. The updated filter configuration file selectively identifies the source designation of one or more of the plurality of sources. The packet filter only passes packets or groups of packets originating from the sources identified in the updated filter configuration file.

In a further aspect, a system transfers packetized information from a source in a first network domain to a destination in a second network domain. The system includes a one-way data link, a first server computer and a second server computer. The one-way data link has an input and an output. The first server computer is coupled to receive packetized information from a source via a first network in the first network domain. The first server computer includes a send application configured to receive packetized information on an input coupled to the first network and to forward the packetized information to the input of the one-way data link. The second server computer is coupled to the output of the one-way data link and includes a receive application for receiving the packetized information from the one-way data link and configured to forward the received packetized information on an output. The second server computer also includes a packet filter configured to receive packets or groups of packets on an input coupled to the output of the receive application, to compare predetermined portions of the packets or groups of packets with information or criteria stored in a filter configuration file, and, if the information at the predetermined portions of the packets or groups of packets matches the information or criteria stored in the filter configuration file, to forward the packets or groups of packets to a destination client via a second network in the second network domain. Finally, the second server computer includes a filter configuration interface configured to receive a file on an input, to verify that the received file conforms to a predetermined specification, and, if the received file conforms to the predetermined specification, to replace the filter configuration file with the received file.

In a still further aspect, a system selectively transfers packetized information from one of a plurality of sources in a first network domain to a destination in a second network domain. The system includes a one-way data link, a first server computer, a second server computer, and a third server computer. The one-way data link has an input and an output. The first server computer is coupled to receive packetized information from a plurality of sources via a first network in the first network domain, the packetized information including a source designation. The first server computer includes a send application configured to receive packetized information from an input coupled to the first network and to forward the packetized information to the input of the one-way data link. The second server computer is coupled to the output of the one-way data link and includes a receive application for receiving the packetized information from the one-way data link and configured to forward the received packetized information on an output. The second server computer also includes a packet filter configured to receive packets or groups of packets on an input coupled to the receive application, to compare predetermined portions of the packets or groups of packets with information or criteria stored in a stored filter configuration file, and, if the information at the predetermined portions of the packets or groups of packets matches the information or criteria stored in the stored filter configuration file, to forward the packets or groups of packets to a destination client via a second network in the second network domain. The second server computer further includes a filter configuration interface configured to receive an updated filter configuration file on an input, to verify that the received updated filter configuration file conforms to a predetermined specification, and, if the received updated filter configuration file conforms to the predetermined specification, to replace the stored filter configuration file with the received updated filter configuration file. The third server computer in the second network domain is coupled to the second server computer and is configured to provide the updated filter configuration file to the filter configuration interface. The updated filter configuration file selectively identifies the source designation of one or more of the plurality of sources. The packet filter only passes packets or groups of packets originating from the sources identified in the updated filter configuration file.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION

In the present disclosure, like reference numbers refer to like elements throughout the drawings, which illustrate various exemplary embodiments of the present invention.

Figure 1:
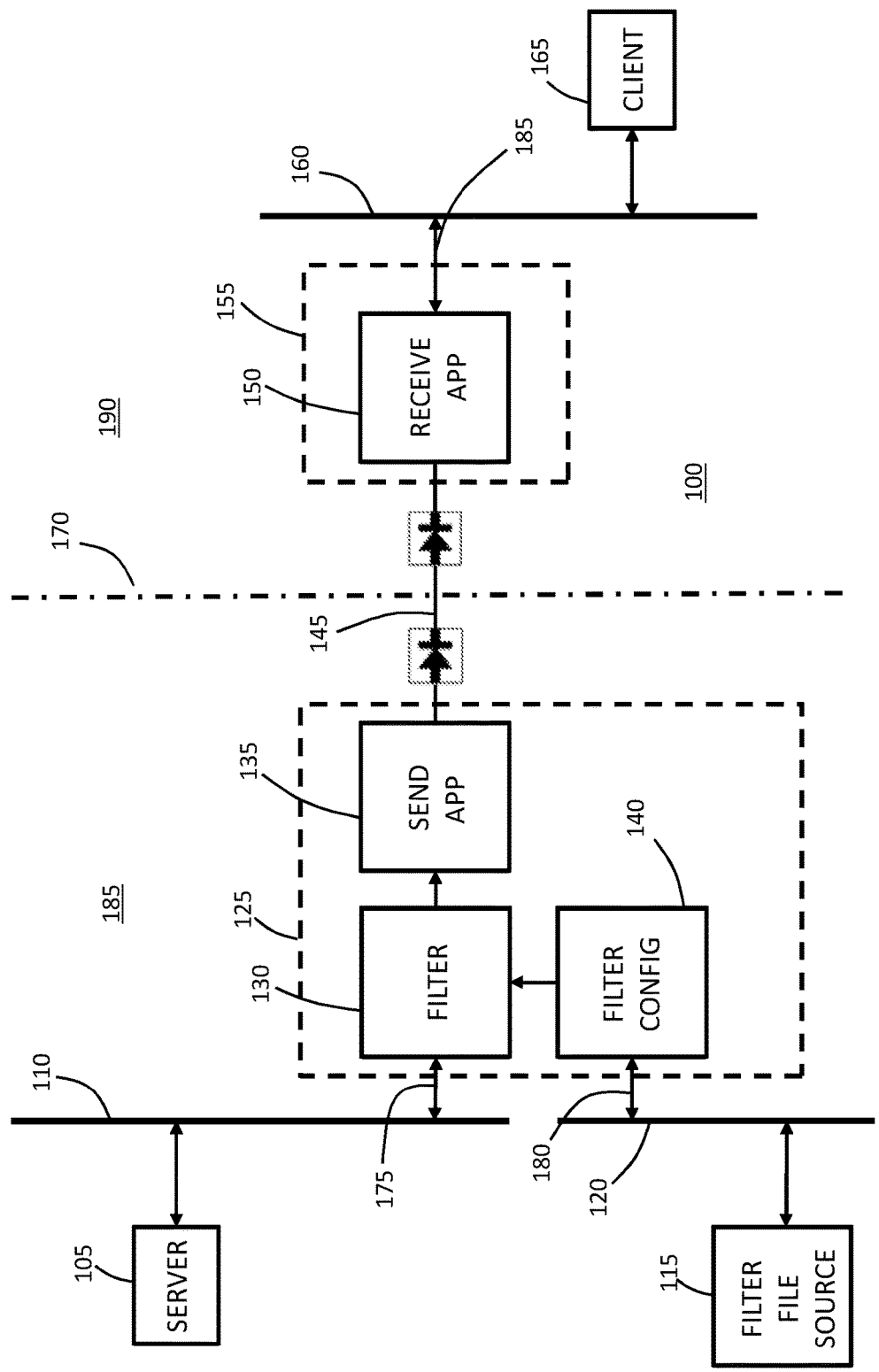
FIG. 1 is a block diagram of a one-way data transfer system incorporating aspects of a first embodiment of the present disclosure.

Referring now to the drawings, and in particular to FIG. 1, a cross-domain system 100 is shown for passing packets of data from a server computer 105 (the source server) on a first network 110 in a first network domain (i.e., the area 185 to the left of the dotted line 170) to a client 165 (the destination client) on a second network 160 in a second network domain (i.e., the area 190 to the right of the dotted line 170). System 100 includes a first server computer 125 positioned within the first security domain 185 (the "send-side") and a second server computer 155 positioned within the second security domain 190 (the "receive-side"). In one embodiment, first security domain 185 is a higher security domain and second security domain 190 a lower security domain. In an alternative embodiment, first security domain 185 is a lower security domain and second security domain 190 is a higher security domain. Server computer 125 is coupled to server computer 155 only via a one-way data link 145. One-way data link 145 may, for example, consist of a pair of communication cards supplied by Owl Computing Technologies® (one of the two cards being a transmit-only card and the other of the two cards being a receive-only card) coupled via an optical fiber, with the transmit-only card mounted in the first server computer 105 and the receive-only card mounted in the second server computer 155. The one-way data link allows data to be transferred from first server computer 125 to second server computer 155 but prevents any data (actually any signal whatsoever) from passing from second server computer 155 to first server computer 125. In the alternative, first server computer 125, one-way data link 145 and second server computer 155 may be provided as part of an integrated solution mounted within a single housing, similar to the OPDS-100 product supplied by Owl Computing Technologies®.

The first server computer 125 includes a first conventional network interface 175 connected to a first network 110 that, in turn, is coupled to a filter 130. Filter 130 is a packet filter which analyzes, as discussed in detail below, each received packet or groups of packets according to a specific criteria defined in a filter configuration file provide via a filter configuration interface 140 and either outputs the received packet or groups of packets or discards such packet or groups of packets, depending on whether or not the received packet or groups of packets conform to the defined specific criteria. The output of filter 130 is coupled to a send application 135 for transmitting the received packets of data that conform to the set of filter definitions across the one-way data link 145 to second server computer 155. Second server computer 155 includes a receive application 150 which receives the packets of data transmitted by send application 135 via the one-way data link 145 and forwards such packets of data, via a network interface connection 185 connected to a second network 160, to a destination client 165. The transmission of the packets of data across the one-way data link 145 is conventional, as discussed, for example in U.S. Pat. No. 8,139,581, issued to Owl Computing Technologies® and which is incorporated by reference in its entirety.

In the embodiment shown in FIG. 1, filter configuration interface 140 is coupled to a second conventional network interface 180 in first server computer 125 which, in turn, is connected to a third network 120, separate from network 110, that is also in the first network domain. Filter configuration interface 140 is an application that preconfigured to receive filter configuration files from a filter file source 115 that is also coupled to network 120. The transfer of the filter configuration file from filter file source 115 is accomplished, for example, using the RFTS application from Owl Computing Technologies® which includes a small application running on filter file source 115 that automatically transfers files placed in a predetermined and dedicated output file folder on filter file source 115 to a predetermined and dedicated input file folder on server computer 125, via network 120 and network interface 180. Filter configuration application 140 monitors the predetermined and dedicated input file folder on server computer 125, and when a new filter configuration file is received, the new filter configuration file is automatically transferred to filter 130, after validation of the new configuration file (as discussed below).

In a preferred embodiment, the filter configuration file is an Extensible Markup Language ("XML") file that defines the allowable content within each received packet. In one example, certain packets from a particular source may be tagged with information identifying that source, with the tag information appearing at a certain location within the packets (i.e. an intra-packet location). The XML filter configuration file may then include both the actual tag information and the tag location information. Other types of markup-language files may be used for the filter configuration file instead of XML. Furthermore, the filter configuration file may be in a custom user-defined format. Once the new filter configuration file is received and then transferred to filter 130, filter 130 will only output packets of data having the actual tag location at the particularly identified tag location within the packet or groups of packets, and all other received packets will be blocked and, preferably discarded, at filter 130. In another example, certain packets from a particular source may include criteria specifying a range of possible values, with the range information appearing at a certain location within the packets. In some cases, it may be desirable to only pass packets having a limited range of values that is less than the full range (i.e., to block packets not having that limited range of values). In this situation, the XML filter configuration file may include both the criteria specifying the allowable range and the location information specifying where the range information will appear within each packet. Once the new filter configuration file is received and then transferred to filter 130, filter 130 will only output packets of data having range information that conforms to the criteria at the particularly identified location within the packet or groups of packets, and all other received packets will be blocked and, preferably discarded, at filter 130. System 100 provides the ability to remotely control the flow of information from the first information domain into the second information domain, via the filter file source 115. For example, when there are a plurality of server computers 105 coupled to network 110, each streaming packets of data, for example video data, tagged with source information, a user can elect and dynamically change which of the packet streams is transferred into the second information domain (and ultimately to client 165) simply by modifying the filter configuration file at filter file source 115 to change the source information (and, for example, transferring the new filter configuration file into the predetermined and dedicated file folder at filter file source 115). As one of ordinary skill in the art will readily recognize, there are many ways of tagging the data to be transferred, e.g., secrecy levels, source identification, location, etc. In addition, the packets of data may have preexisting information that may be used for filtering, and the present disclosure is not limited to situations where the supplying server computer 105 adds tag information to the transferred packets of data.

Figure 2:
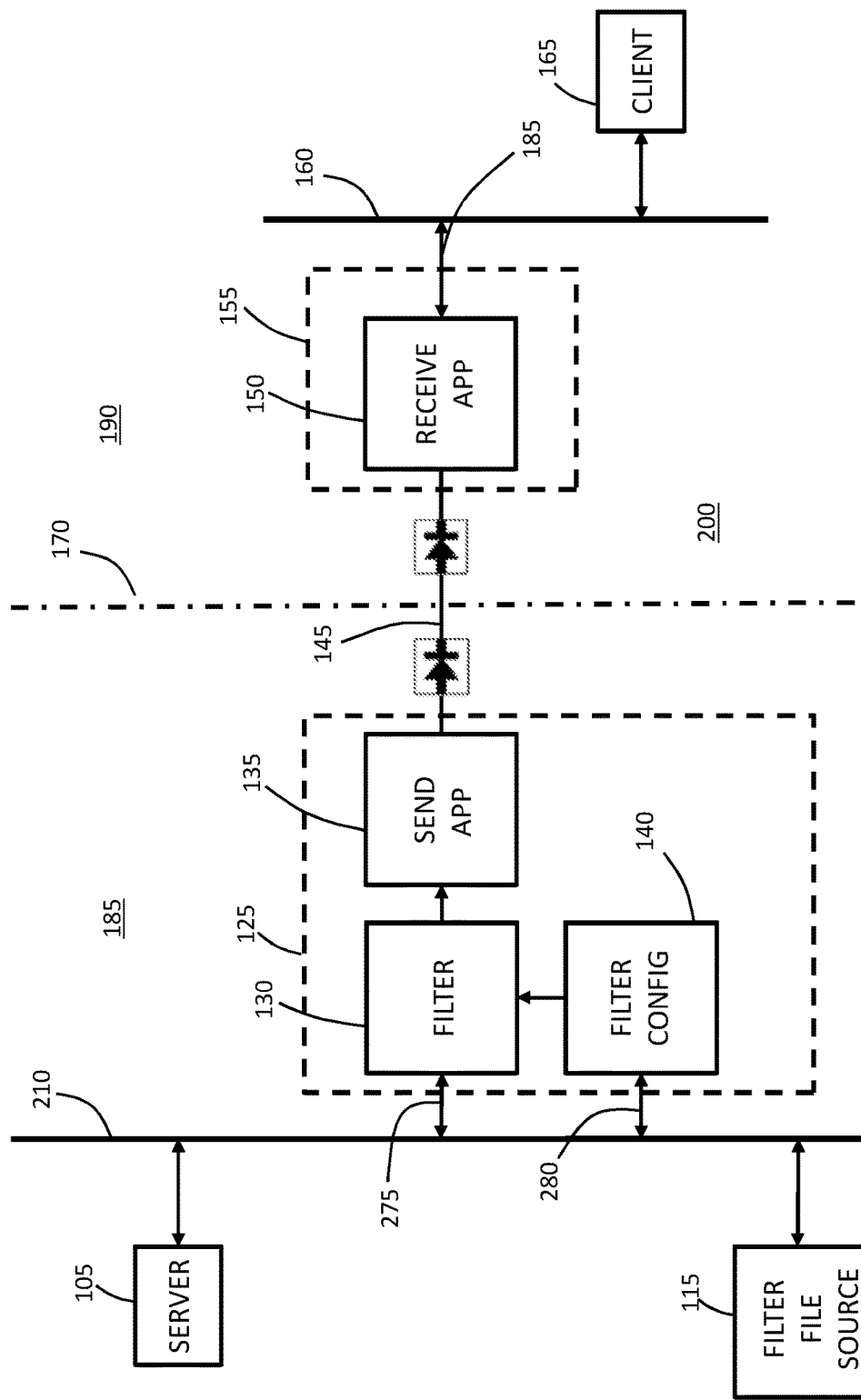
FIG. 2 is a block diagram of a one-way data transfer system incorporating aspects of a second embodiment of the present disclosure.

Referring now to FIG. 2, the system 100 of FIG. 1 may be altered slightly in some situations where the server computer 105 supplying packets of data and the filter file source 115 are coupled to the same network 210 in the first network domain (shown by system 200 in FIG. 2). In this situation, a common network interface may be used in server computer 125, with separate ports assigned for filter 130 (port 275) and filter configuration interface 140 (port 280). The system 200 otherwise operates identically to system 100 of FIG. 1, as discussed herein. In the alternative, server computer 125 may include two separate network interfaces, a first network interface dedicated for use with the filter 130 and a second network interface dedicated for use with filter configuration interface 140, as shown in FIG. 1, but with both network interfaces coupled to the same network 210.

Figure 3:
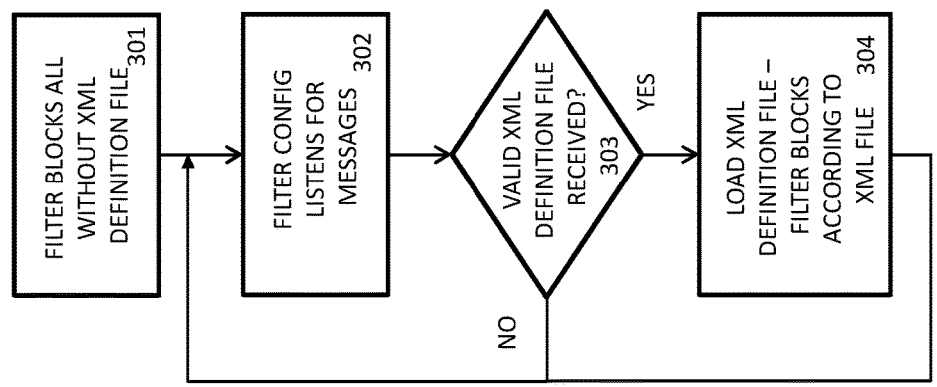
FIG. 3 is a flowchart showing the operation of the filter in the one-way data transfer system of the present disclosure.

FIG. 3 is a flowchart of operation of system 100. Initially, at startup (step 302) and prior to receipt of a filter configuration file at filter configuration application 140, filter 130 blocks all received packets of data. Filter configuration application 302 effectively "listens" for incoming messages (e.g., by iteratively checking, at predetermined intervals, the designated receive file folder for a new filter configuration file when using RFTS). When a new filter configuration file is identified (step 303), it is validated (e.g., by ensuring that it is a valid XML file), and if valid, it is provided to filter 130 and written into a predetermined location, either as a new file (upon initial receipt) or by overwriting the previous file (step 304). If the new file is not valid, processing returns to step 302 to wait for another new filter configuration file. Once the file is installed in the predetermined location, filter 130 begins to filter based on the new information (e.g., by blocking any packet of data that does not conform to the filter configuration file).

Figure 4:
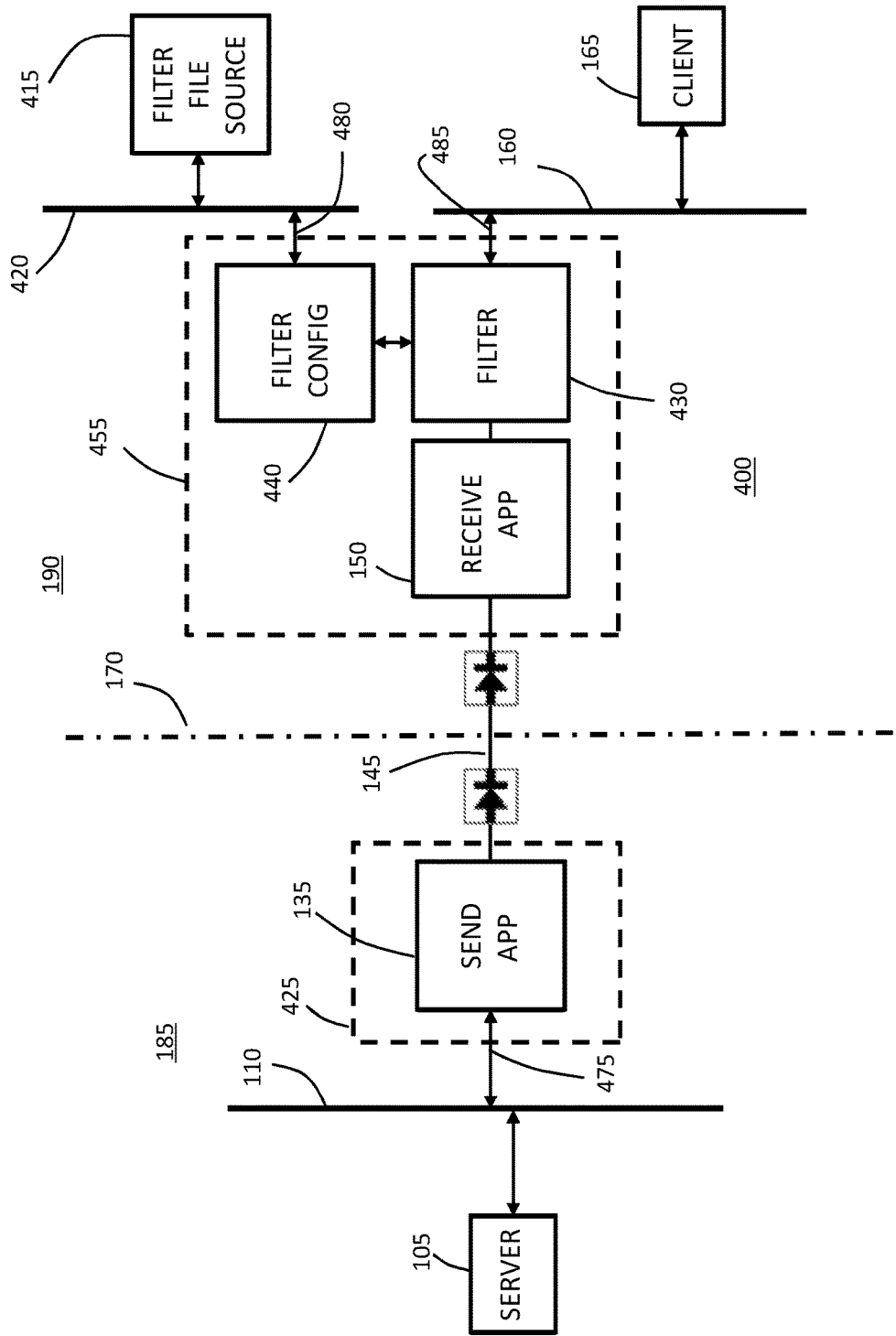
FIG. 4 is a block diagram of a one-way data transfer system incorporating aspects of a third embodiment of the present disclosure.

Referring now to FIG. 4, a third embodiment of a cross-domain system 400 is shown in which the filtering is performed on the receive-side in a second server computer 455 (in the first and second embodiments shown in FIGS. 1 and 2, respectively, the filtering is performed on the send-side in server computer 125). In particular, first server computer 425 includes a send application 135 which is directly coupled to first network 110 via a network interface connection 475. Send application 135 receives packets or groups of packets of information from a server 105 via first network 110 and network interface connection 475. Send application 135 forwards these packets or groups of packets to receive application 150 on second server computer 455 via one-way data link 145. In this embodiment, second server computer 455 includes a filter 430 coupled to the output of the receive application 150. Filter 430 operates identically to filter 130 in FIGS. 1 and 2, operating on the data stream output by receive application 150. As discussed above, this data stream is in the form of packet or groups of packets of information. Filter 430 has an output coupled to a network interface connection 485, which in turn is coupled to second network 160. Filter 430 is configured to forward all received packets or groups of packets which have met the filter criteria to client 165 via network interface connection 485 and network 160. Filter 430 is also coupled to a filter configuration interface 440, which has an input coupled to a separate third network 420 via network interface connection 480. A filter file source 415 is also coupled to network 420. Filter configuration interface 440 operates identically to filter configuration interface 140 in FIGS. 1 and 2, receiving filter configuration files from filter file source 415 via network 420 and network interface connection 480 and automatically transferring such filter configuration files to filter 430 after validation thereof.

Figure 5:
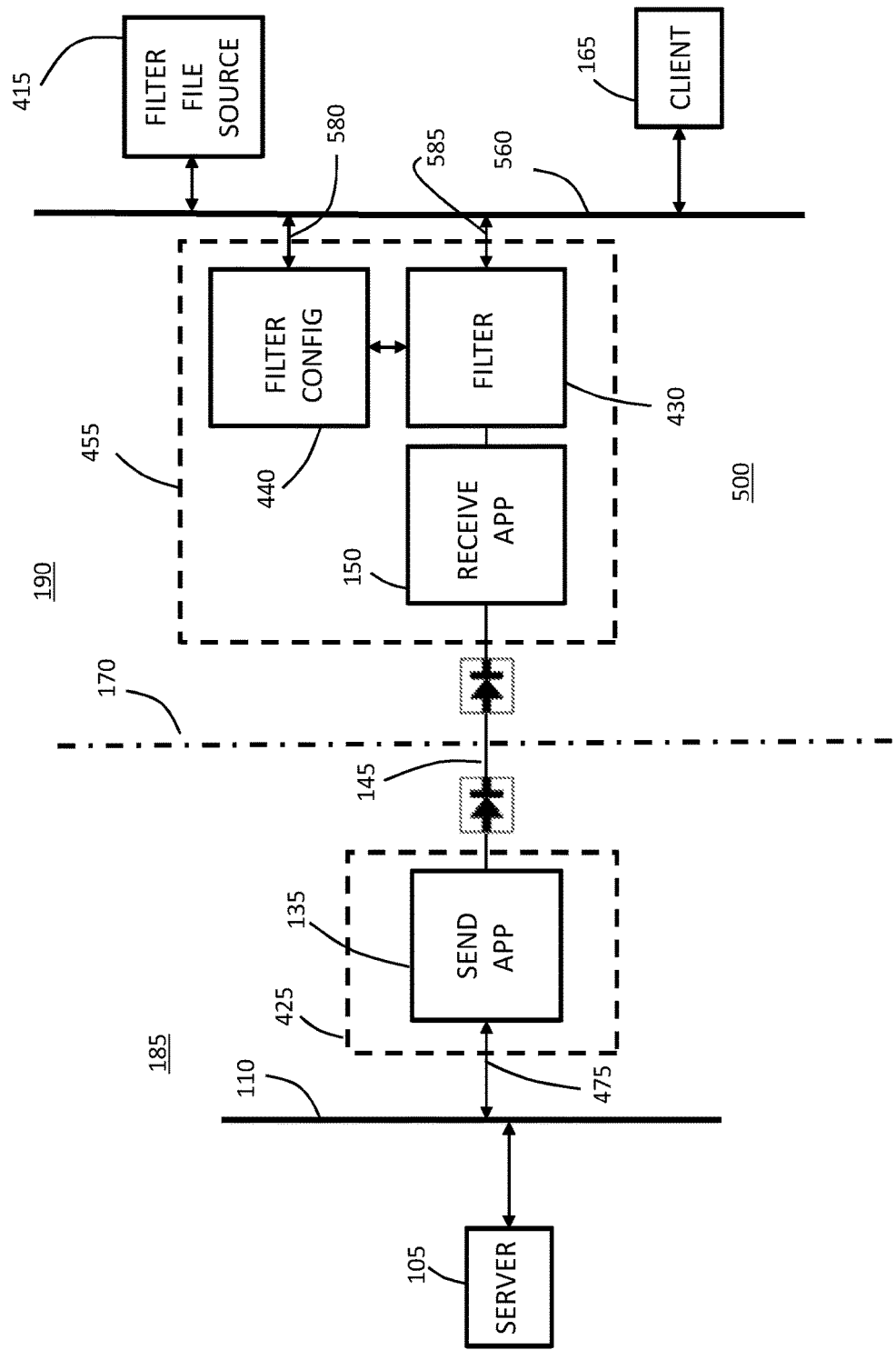
FIG. 5 is a block diagram of a one-way data transfer system incorporating aspects of a fourth embodiment of the present disclosure.

Referring now to FIG. 5, a fourth embodiment of a cross-domain system 500 is shown in which the filtering is, like in the third embodiment, performed on the receive-side in a second server computer 455 (in the first and second embodiments shown in FIGS. 1 and 2, respectively, the filtering is performed on the send-side in server computer 125). System 500 is a variation of system 400 shown in FIG. 4 where may be altered slightly in some situations where the client computer 165 receiving packets of data and the filter file source 415 are coupled to the same network 560 in the second network domain (shown as system 500 in FIG. 5). In this situation, a common network interface may be used in server computer 455, with separate ports assigned for filter 430 (port 585) and filter configuration interface 440 (port 580). The system 500 otherwise operates identically to system 400 of FIG. 4, as discussed herein. In the alternative, server computer 455 may include two separate network interfaces, a first network interface dedicated for use with the filter 430 and a second network interface dedicated for use with filter configuration interface 440, as shown in FIG. 4, but with both network interfaces coupled to the same network 560.

In a still further embodiment, a system may include filters and associated filter configuration interfaces on both the send-side server computer and the receive-side server computer, with each filter configuration interface coupled to an associated filter file source located within the same network domain as the send-side server computer and the receive-side server computer, respectively.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A configurable packet filtering system, comprising:
a packet filter configured to receive packets or groups of packets on an input, to compare predetermined portions of the packets or groups of packets with information or criteria stored in a filter configuration file, and, in response to the information at the predetermined portions of the packets or groups of packets matching the information or criteria stored in the filter configuration file, to forward the packets or groups of packets on an output; and
a filter configuration interface configured to receive a file on an input, to verify that the received file conforms to a predetermined specification, and, in response to the received file conforming to the predetermined specification, to automatically replace the filter configuration file with the received file.

2. The configurable packet filtering system of claim 1, wherein the input of the packet filter comprises a first network interface connection and the input of the filter configuration interface comprises a second network interface.

3. The configurable packet filtering system of claim 2, wherein the first network interface is coupled to a first network and the second network interface is coupled to a second network, separate from the first network.

4. The configurable packet filtering system of claim 1, wherein the input of the packet filter comprises a first port of a network interface connection that is coupled to a network and the input of the filter configuration interface comprises a second separate port of the network interface.

5. The configurable packet filtering system of claim 1, wherein the output of the packet filter is coupled to a destination client via a one-way data link.

6. The configurable packet filtering system of claim 1, wherein the filter configuration file is an Extensible Markup Language (XML) file that includes information specifying an intra-packet location and associated data or criteria, and wherein the packet filter is further configured to compare data in the received packet or groups of packets at the intra-packet location specified in the XML file with the associated data or criteria in the XML file, and to only forward the received packet or groups of packets on the output in response to the data in the received packet or groups of packets at the intra-packet location specified in the XML file matching the associated data or criteria in the XML file.

7. The configurable packet filtering system of claim 1, wherein the predetermined portions of the packets or groups of packets is determined based on information included within the filter configuration file.

8. The configurable packet filtering system of claim 1, wherein the output of the packet filter comprises a first network interface connection and the input of the filter configuration interface comprises a second network interface.

9. The configurable packet filtering system of claim 8, wherein the first network interface is coupled to a first network and the second network interface is coupled to a second network, separate from the first network.

10. The configurable packet filtering system of claim 1, wherein the output of the packet filter comprises a first port of a network interface connection that is coupled to a network and the input of the filter configuration interface comprises a second separate port of the network interface.

11. The configurable packet filtering system of claim 1, wherein the input of the packet filter is coupled to a source server via a one-way data link.

12. A system for transferring packetized information from a source in a first network domain to a destination in a second network domain, comprising:
a one-way data link having an input and an output;
a first server computer coupled to receive packetized information from a source via a first network in the first network domain, the first server computer comprising:
a packet filter configured to receive packets or groups of packets on an input coupled to the first network, to compare predetermined portions of the packets or groups of packets with information or criteria stored in a filter configuration file, and, in response to the information at the predetermined portions of the packets or groups of packets matching the information or criteria stored in the filter configuration file, to forward the packets or groups of packets on an output;
a filter configuration interface configured to receive a file on an input, to verify that the received file conforms to a predetermined specification, and, in response to the received file conforming to the predetermined specification, to automatically replace the filter configuration file with the received file; and
a send application configured to receive packetized information from the output of the packet filter and to forward the packetized information to the input of the one-way data link; and
a second server computer coupled to the output of the one-way data link and comprising a receive application for receiving the packetized information from the one-way data link and configured to forward the received packetized information to a destination client via a second network in the second network domain.

13. The system filter of claim 12, wherein the input of the packet filter comprises a first network interface connection and the input of the filter configuration interface comprises a second network interface.

14. The system of claim 13, wherein the first network interface is coupled to a first network and the second network interface is coupled to a second network, separate from the first network.

15. The system of claim 12, wherein the input of the packet filter comprises a first port of a network interface connection that is coupled to a network and the input of the filter configuration interface comprises a second separate port of the network interface.

16. The system of claim 12, wherein the filter configuration file is an Extensible Markup Language (XML) file that includes information specifying an intra-packet location and associated data or criteria, and wherein the packet filter is further configured to compare data in the received packet or groups of packets at the intra-packet location specified in the XML file with the associated data or criteria in the XML file, and to only forward the received packet or groups of packets on the output in response to the data in the received packet or groups of packets at the intra-packet location specified in the XML file matching the associate data or criteria in the XML file.

17. The system of claim 12, wherein the predetermined portions of the packets or groups of packets is determined based on information included within the filter configuration file.

18. A system for selectively transferring packetized information from one of a plurality of sources in a first network domain to a destination in a second network domain, comprising:
a one-way data link having an input and an output;
a first server computer coupled to receive packetized information from a plurality of sources via a first network in the first network domain, the packetized information including a source designation, the first server computer comprising:
a packet filter configured to receive packets or groups of packets on an input coupled to the first network, to compare predetermined portions of the packets or groups of packets with information or criteria stored in a stored filter configuration file, and, in response to the information at the predetermined portions of the packets or groups of packets matching the information or criteria stored in the stored filter configuration file, to forward the packets or groups of packets on an output;
a filter configuration interface configured to receive an updated filter configuration file on an input, to verify that the received updated filter configuration file conforms to a predetermined specification, and, in response to the received updated filter configuration file conforming to the predetermined specification, to automatically replace the stored filter configuration file with the received updated filter configuration file; and
a send application configured to receive packetized information from the output of the packet filter and to forward the packetized information to the input of the one-way data link;
a second server computer coupled to the output of the one-way data link and comprising a receive application for receiving the packetized information from the one-way data link and configured to forward the received packetized information to a destination client via a second network in the second network domain; and
a third server computer in the first network domain coupled to the first server computer and configured to provide the updated filter configuration file to the filter configuration interface; and
wherein the updated filter configuration file selectively identifies the source designation of one or more of the plurality of sources and wherein the packet filter only passes packets or groups of packets originating from the sources identified in the updated filter configuration file.

19. The system filter of claim 18, wherein the input of the packet filter comprises a first network interface connection and the input of the filter configuration interface comprises a second network interface.

20. The system of claim 19, wherein the first network interface is coupled to a first network and the second network interface is coupled to a second network, separate from the first network.

21. The system of claim 18, wherein the input of the packet filter comprises a first port of a network interface connection that is coupled to a network and the input of the filter configuration interface comprises a second separate port of the network interface.

22. The system of claim 18, wherein the filter configuration file is an Extensible Markup Language (XML) file that includes information specifying an intra-packet location and associated data or criteria, and wherein the packet filter is further configured to compare data in the received packet or groups of packets at the intra-packet location specified in the XML file with the associated data or criteria in the XML file, and to only forward the received packet or groups of packets on the output in response to the data in the received packet or groups of packets at the intra-packet location specified in the XML file matching the associated data or criteria in the XML file.

23. The system of claim 18, wherein the predetermined portions of the packets or groups of packets is determined based on information included within the filter configuration file.

24. A system for transferring packetized information from a source in a first network domain to a destination in a second network domain, comprising:
a one-way data link having an input and an output;
a first server computer coupled to receive packetized information from a source via a first network in the first network domain, the first server computer comprising a send application configured to receive packetized information on an input coupled to the first network and to forward the packetized information to the input of the one-way data link;
a second server computer coupled to the output of the one-way data link and comprising:
a receive application for receiving the packetized information from the one-way data link and configured to forward the received packetized information on an output;
a packet filter configured to receive packets or groups of packets on an input coupled to the output of the receive application, to compare predetermined portions of the packets or groups of packets with information or criteria stored in a filter configuration file, and, in response to the information at the predetermined portions of the packets or groups of packets matching the information or criteria stored in the filter configuration file, to forward the packets or groups of packets to a destination client via a second network in the second network domain; and
a filter configuration interface configured to receive a file on an input, to verify that the received file conforms to a predetermined specification, and, in response to the received file conforming to the predetermined specification, to automatically replace the filter configuration file with the received file.

25. The system filter of claim 24, wherein the output of the packet filter comprises a first network interface connection and the input of the filter configuration interface comprises a second network interface.

26. The system of claim 25, wherein the first network interface is coupled to a first network and the second network interface is coupled to a second network, separate from the first network.

27. The system of claim 24, wherein the output of the packet filter comprises a first port of a network interface connection that is coupled to a network and the input of the filter configuration interface comprises a second separate port of the network interface.

28. The system of claim 24, wherein the filter configuration file is an Extensible Markup Language (XML) file that includes information specifying an intra-packet location and associated data or criteria, and wherein the packet filter is further configured to compare data in the received packet or groups of packets at the intra-packet location specified in the XML file with the associated data or criteria in the XML file, and to only forward the received packet or groups of packets in response to the data in the received packet or groups of packets at the intra-packet location specified in the XML file matching the associated data or criteria in the XML file.

29. The system of claim 24, wherein the predetermined portions of the packets or groups of packets is determined based on information included within the filter configuration file.

30. A system for selectively transferring packetized information from one of a plurality of sources in a first network domain to a destination in a second network domain, comprising:
a one-way data link having an input and an output;
a first server computer coupled to receive packetized information from a plurality of sources via a first network in the first network domain, the packetized information including a source designation, the first server computer comprising a send application configured to receive packetized information from an input coupled to the first network and to forward the packetized information to the input of the one-way data link:

a second server computer coupled to the output of the one-way data link and comprising:

a receive application for receiving the packetized information from the one-way data link and configured to forward the received packetized information on an output;

a packet filter configured to receive packets or groups of packets on an input coupled to the receive application, to compare predetermined portions of the packets or groups of packets with information or criteria stored in a stored filter configuration file, and, in response to the information at the predetermined portions of the packets or groups of packets matching the information or criteria stored in the stored filter configuration file, to forward the packets or groups of packets to a destination client via a second network in the second network domain; and a filter configuration interface configured to receive an updated filter configuration file on an input, to verify that the received updated filter configuration file conforms to a predetermined specification, and, in response to the received updated filter configuration file conforming to the predetermined specification, to automatically replace the stored filter configuration file with the received updated filter configuration file; and a third server computer in the second network domain coupled to the second server computer and configured to provide the updated filter configuration file to the filter configuration interface; and wherein the updated filter configuration file selectively identifies the source designation of one or more of the plurality of sources and wherein the packet filter only passes packets or groups of packets originating from the sources identified in the updated filter configuration file.

31. The system filter of claim 30, wherein the output of the packet filter comprises a first network interface connection and the input of the filter configuration interface comprises a second network interface.

32. The system of claim 31, wherein the first network interface is coupled to a first network and the second network interface is coupled to a second network, separate from the first network.

33. The system of claim 30, wherein the output of the packet filter comprises a first port of a network interface connection that is coupled to a network and the input of the filter configuration interface comprises a second separate port of the network interface.

34. The system of claim 30, wherein the filter configuration file is an Extensible Markup Language (XML) file that includes information specifying an intra-packet location and associated data or criteria, and wherein the packet filter is further configured to compare data in the received packet or groups of packets at the intra-packet location specified in the XML file with the associated data or criteria in the XML file, and to only forward the received packet or groups of packets in response to the data in the received packet or groups of packets at the intra-packet location specified in the XML file matching the associated data or criteria in the XML file.

35. The system of claim 30, wherein the predetermined portions of the packets or groups of packets is determined based on information included within the filter configuration file.

* * * * *